(12) United States Patent
Bergmann et al.

(10) Patent No.: US 11,034,224 B2
(45) Date of Patent: Jun. 15, 2021

(54) PROFILE STRIP ARRANGEMENT, MOUNTING ASSEMBLY, MOTOR VEHICLE ASSEMBLY AND METHOD FOR MOUNTING A MOTOR VEHICLE ASSEMBLY

(71) Applicant: Elkamet Kunststofftechnik GmbH, Biedenkopf (DE)

(72) Inventors: Lutz Bergmann, Ehringshausen (DE); Carsten Burk, Dautphetal (DE); Christoph Hain, Niederdieten (DE); Marco Hain, Eschenburg (DE); David Landeck, Marburg (DE); Jens Loehnert, Lohra (DE); Michael Ortmueller, Dautphetal-Herzhausen (DE); Hartmut Roth, Biedenkopf (DE); Marcus Schneider, Dautphetal (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 284 days.

(21) Appl. No.: 16/097,684

(22) PCT Filed: May 16, 2017

(86) PCT No.: PCT/EP2017/061692
§ 371 (c)(1),
(2) Date: Oct. 30, 2018

(87) PCT Pub. No.: WO2017/202645
PCT Pub. Date: Nov. 30, 2017

(65) Prior Publication Data
US 2019/0160928 A1 May 30, 2019

(30) Foreign Application Priority Data

May 24, 2016 (DE) ...................... 10 2016 109 471.4

(51) Int. Cl.
*B60J 10/70* (2016.01)
(52) U.S. Cl.
CPC .................................... *B60J 10/70* (2016.02)
(58) Field of Classification Search
CPC ............. B60J 10/70; B60J 10/36; B60J 10/45
(Continued)

(56) References Cited

U.S. PATENT DOCUMENTS

2003/0057660 A1 3/2003 Ortmuller et al.
2007/0246966 A1 10/2007 Polke
(Continued)

FOREIGN PATENT DOCUMENTS

CN 1223206 A 7/1999
CN 101920646 A 12/2010
(Continued)

*Primary Examiner* — Joseph D. Pape
(74) *Attorney, Agent, or Firm* — Leydig, Voit & Mayer, Ltd.

(57) ABSTRACT

A profile strip arrangement includes a profile strip having a first connecting area configured to establish a connection to an edge area of a windshield of a motor vehicle and having a second connecting area configured to establish a connection to a vehicle part that is adjacent to the windshield. A reinforcement strip is detachably connected to the profile strip. The reinforcement strip has an insertion section that is configured to be inserted into and remain permanently in the second connecting area. The reinforcement strip also has a connecting section configured to establish a connection to the adjacent vehicle part.

23 Claims, 4 Drawing Sheets

(58) Field of Classification Search
USPC .................................. 296/93, 146.15, 201
See application file for complete search history.

(56) References Cited

U.S. PATENT DOCUMENTS

| | | | |
|---|---|---|---|
| 2011/0115261 A1 | 5/2011 | Platt et al. | |
| 2015/0246603 A1 | 9/2015 | Silvestrini | |
| 2016/0001645 A1* | 1/2016 | Ortmueller | B60J 10/18 403/288 |
| 2016/0101675 A1* | 4/2016 | Timmermann | B60J 10/34 296/93 |

FOREIGN PATENT DOCUMENTS

| | | | | |
|---|---|---|---|---|
| DE | 3702555 A1 | 8/1988 | | |
| DE | 20008555 U1 | 9/2000 | | |
| DE | 202008006986 U1 | 10/2009 | | |
| DE | 102012110472 B3 | 3/2014 | | |
| EP | 2253556 A1 | 11/2010 | | |
| EP | 2586638 A2 | 5/2013 | | |
| FR | 1388582 A | 2/1965 | | |
| FR | 2684051 A1 * | 5/1993 | ............. | B60J 10/79 |
| WO | WO 2006002891 A2 | 1/2006 | | |
| WO | WO 2014041279 A1 | 3/2014 | | |

* cited by examiner

PROFILE STRIP ARRANGEMENT, MOUNTING ASSEMBLY, MOTOR VEHICLE ASSEMBLY AND METHOD FOR MOUNTING A MOTOR VEHICLE ASSEMBLY

CROSS-REFERENCE TO PRIOR APPLICATIONS

This application is a U.S. National Stage Application under 35 U.S.C. § 371 of International Application No. PCT/EP2017/061692 filed on May 16, 2017, and claims benefit to German Patent Application No. DE 10 2016 109 471.4 filed on May 24, 2016. The International Application was published in German on Nov. 30, 2017 as WO 2017/202645 A1 under PCT Article 21(2).

FIELD

The invention relates to a profile strip arrangement comprising a profile strip having a first connecting area that serves to establish a connection to an edge area of a windshield of a motor vehicle and having a second connecting area that serves to establish a connection to a vehicle part that is adjacent to the windshield, also comprising a reinforcement strip that is detachably connected to the profile strip.

The invention also relates to an assembly module comprising a profile strip arrangement and a windshield.

The invention also relates to a vehicle module comprising an adjacent vehicle part, also comprising a profile strip arrangement or an assembly module.

The invention also relates to a method to assemble a vehicle module.

BACKGROUND

Profile strips known from the state of the art, for example, from German utility model DE 200 08 555 U1 and German utility model DE 20 2008 006 986 U1, serve to connect a lower edge area of a windshield of a motor vehicle to an adjacent vehicle part. The adjacent vehicle part is especially a so-called water trough cover that is normally latched to the profile strip. The water trough cover serves to cover a water trough that collects water running off the motor vehicle window pane and to drain it away in a controlled manner into the engine compartment and underneath the motor vehicle. The water trough can be part of the car body.

After the profile strip has been manufactured, it is connected to the edge area of the windshield, especially glued to it. This assembly step is normally carried out by the suppliers, so that the suppliers can provide the automobile manufacturer with a module consisting of the windshield and the profile strip that is connected to the windshield. This module is then connected to a windshield receptacle of a car body within the scope of the final assembly of a motor vehicle; moreover, the adjacent vehicle part is joined to the profile strip.

During the transport of the above-mentioned module from the supplier to the automobile manufacturer, the second connecting area of the profile strip projects away from the windshield and is thus exposed to mechanical influences. At the same time, it is desirable for the module to be transported in a space-saving and "standing" position, that is to say, for the windshield to be transported upright. Moreover, it is also desirable for the windshield to be protected against damage to its lower edge area during the transport. Such a protection is ensured in that the windshield rests on the profile strip while it is being transported. However, this means that the weight of the windshield is bearing down on the profile strip during the transport of the module. This load brings about an undesired deformation of the second connecting area of the profile strip.

In order to prevent deformation of a profile strip that is connected to a windshield, it is known from the state of the art (for example, from international patent application WO 2006/002891 A2, European patent application EP 2 253 556 A1 and international patent application WO 2014/041279 A1) to reinforce the second connecting area with a reinforcement strip (also referred to as a "keder rail"). Such a reinforcement strip is placed into a receiving space of the second connecting area so that the receiving space is reinforced by means of the material of the reinforcement strip, thereby at least largely preventing deformation of the second connecting area.

After the "windshield and profile strip" module has been delivered to the automobile manufacturer, the reinforcement strip is then removed from the second connecting area of the profile strip so that the second connecting area can be connected to the adjacent vehicle part, especially to the water trough cover. The reinforcement strip is subsequently disposed of.

In order to remove the reinforcement strip from the second connecting area, European patent application EP 2 253 556 A1 proposes providing the reinforcement strip with an additional handling section in the form of a grip tab so that the reinforcement strip can be pulled out of the second connecting area by manually pulling on the grip tab. A similar handling section in the form of a pull-out ring is known from international patent application WO 2014/041279 A1.

SUMMARY

In an embodiment, the present invention provides a profile strip arrangement. The profile strip arrangement includes a profile strip having a first connecting area configured to establish a connection to an edge area of a windshield of a motor vehicle and having a second connecting area configured to establish a connection to a vehicle part that is adjacent to the windshield. A reinforcement strip is detachably connected to the profile strip. The reinforcement strip has an insertion section that is configured to be inserted into and remain permanently in the second connecting area. The reinforcement strip also has a connecting section configured to establish a connection to the adjacent vehicle part.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
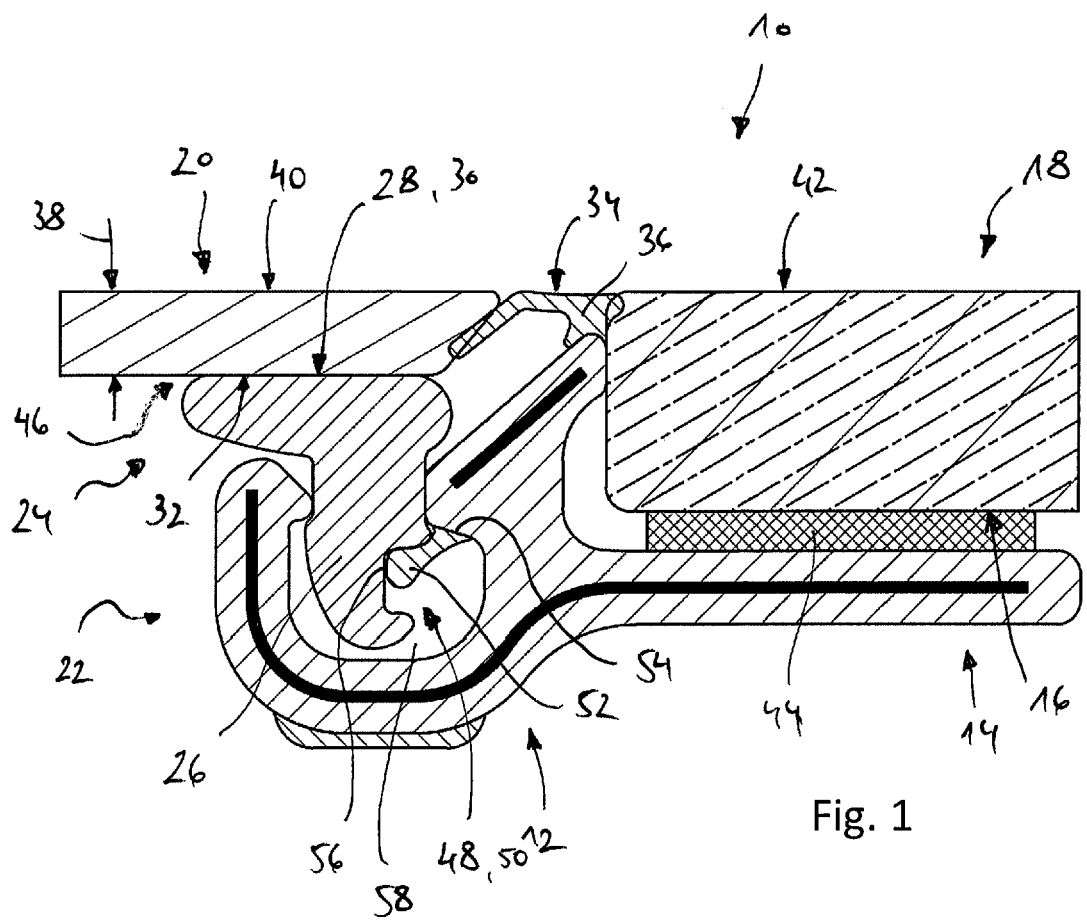
FIG. 1 a side view of an embodiment of a vehicle module.

The above-mentioned additional handling sections simplify the removal of the reinforcement strip from the second connecting area of the profile strip. However, the reinforcement strip and the handling sections first have to be manufactured as individual parts and then the supplier has to mount them onto the profile strip. After the module has been transported to the automobile manufacturer, the automobile manufacturer has to then disassemble the reinforcement strip and the handling sections. Finally, the reinforcement strip and the handling sections have to be collected and disposed of.

Before this backdrop, embodiments of the present invention provide a profile strip arrangement, an assembly module, a vehicle module and a method to assemble a vehicle module by means of which it is possible to achieve the objective of reducing the effort involved in conjunction with the handling of the reinforcement strip.

This objective is achieved according to embodiments of the invention by means of a profile strip arrangement, an assembly module and a vehicle module of the above-mentioned type in that the reinforcement strip has an insertion section that is to be inserted into and remain permanently in the second connecting area, and it also has a connecting section that is to be connected to the adjacent vehicle part.

The above-mentioned objective is achieved according to embodiments of the invention within the scope of a method to assemble a vehicle module in that the insertion section of the reinforcement strip is inserted into the second connecting area of the profile strip after or before the profile strip is connected to an edge area of a windshield, and in that subsequently, the adjacent vehicle part is connected to the reinforcement strip.

According to embodiments of the invention, the reinforcement strip fulfills a dual function. During the transport of an assembly module, the profile strip is protected against deformation in that the insertion section of the reinforcement strip is arranged in the second connecting area. However, the reinforcement strip is not removed from the second connecting area after the transport has been completed, but rather, the insertion section remains permanently in the second connecting area and is connected to the adjacent vehicle part by means of a connecting section of the reinforcement strip. In this manner, the reinforcement strip not only constitutes a transport protection, but, after the final assembly of a motor vehicle, it is also a permanent component of a vehicle module comprising the adjacent vehicle part.

Accordingly, it is preferable that, when the profile strip arrangement is in the unassembled state, the insertion section of the reinforcement strip—in the state in which it is inserted into the second connecting area—constitutes a transport protection for the second connecting area, and that, when the profile strip arrangement is in the assembled state on a motor vehicle, the reinforcement strip forms an arrangement that serves to establish a connection of the adjacent vehicle part to the profile strip.

The configuration according to embodiments of the invention of the profile strip arrangement, of an assembly module comprising a windshield as well as of a vehicle module comprising an adjacent vehicle part has the essential advantage that the reinforcement strip no longer has to be removed from the profile strip after being connected to the second connecting area of the profile strip.

In particular, the reinforcement strip of the profile strip arrangement does not have a handling section that would serve to detach the reinforcement strip from the profile strip. Consequently, it is possible to dispense with the production and assembly of a handling section.

Since the reinforcement strip remains on the profile strip, the reinforcement strips do not have to be collected and then disposed of. The material volume that is required to manufacture the reinforcement strip can then be saved when it comes to the adjacent vehicle part, which can be configured with a correspondingly smaller material volume.

From the vantage point of the automobile manufacturer, this means that an assembly module comprising a profile strip arrangement and a windshield is delivered and that the assembly step of removing the reinforcement strip from the profile strip is then eliminated. The automobile manufacturer merely has to connect a (smaller) adjacent vehicle part to the reinforcement strip. The automobile manufacturer can carry out this assembly step after or before the windshield is connected to a windshield receptacle of the motor vehicle. The assembly step described above replaces the assembly step that is required for conventional profile strip arrangements, which is similar in terms of effort and in which a (larger) adjacent vehicle part is connected to the second connecting area of the profile strip (from which a reinforcement strip has been removed).

The reinforcement strip and the profile strip are preferably detachably connected to each other. In particular, the insertion section is secured in the second connecting area by means of a latching connection. After the connecting section of the reinforcement strip has been connected to the adjacent vehicle part, the latching connection then forms a detachable connector for the adjacent vehicle part relative to the profile strip.

Especially preferably, the geometry of the insertion section of the reinforcement strip matches a geometry that is known from German utility model DE 20 2008 006 986 U1 for an insertion section of the adjacent vehicle part. In a corresponding manner, it is preferable for the profile strip to have a latching receptacle, which has proven its worth in attaining a detachable fixation of an adjacent vehicle part and which is likewise known from German utility model DE 20 2008 006 986 U1, and which comprises a barb-shaped latching element that is secured onto the profile strip and that interacts with a latching element receptacle of the reinforcement strip.

Pertaining to the structure and the mode of operation of such a latching connection, reference is hereby made to the contents of German utility model DE 20 2008 006 986 U1.

Preferred connection modalities for connecting the reinforcement strip to the adjacent vehicle part will be described below. These connection modalities each constitute a so-called "first connector", whereas the connection described above between the reinforcement strip and the profile strip constitutes a so-called "second connector".

For the above-mentioned first connector, in a first embodiment of the invention, it is preferred for the connecting section to have an integral bonding section that establishes an integrally bonded connection to the adjacent vehicle part. For example, the connecting section has a welding section that, after being welded to the adjacent vehicle part, forms a welded connection between the reinforcement strip and the adjacent vehicle part. Preferred welding processes include laser welding, friction or vibration welding, mirror welding, welding by means of heat introduction by additional elements (resistance elements) embedded into the material of the adjacent vehicle part and/or of the reinforcement strip, and also induction welding.

Especially if the connecting section of the reinforcement strip is configured as an integral bonding section, it is preferable that in the state in which the insertion section is inserted into the second connecting area—the connecting section of the reinforcement strip is recessed relative to an outer sealing surface of the profile strip, whereby—in the state in which the adjacent vehicle part is connected to the profile strip—an outer surface of the vehicle part and the outer sealing surface are arranged at the same height. This means that the offset between the connecting section and the outer sealing surface of the profile strip is matched to the thickness of the adjacent vehicle part in such a way that, after the adjacent vehicle part has been assembled, a flush outer surface can be created that comprises the outer surface of the vehicle part and the outer sealing surface of the profile strip. Here, it is particularly preferred for an outer surface of the windshield to also be adjoined in a flush manner, thereby forming an altogether flush arrangement that comprises the outer surfaces of the adjacent vehicle part, of a sealing section of the profile strip, and of the outer surface of the windshield.

Another possibility for connecting the reinforcement strip to the adjacent vehicle part consists of using an intermediate element that is connected to the connecting section and that, as part of a vehicle module, is also connected to the adjacent vehicle part. Such an intermediate element has the advantage that, with an eye towards the specific connection modality, it can be optimized with respect to the reinforcement strip and/or with respect to the adjacent vehicle part.

For example, the intermediate element is an adhesive section. Such an adhesive section can especially be provided on the connecting section of the reinforcement strip, particularly in order to make it easier for an automobile manufacturer to carry out the subsequent assembly step of establishing the connection to the adjacent vehicle part. The adhesive section can be an adhesive compound or an adhesive tape, especially double-sided adhesive tape. It is also possible to use a heat-activated adhesive tape.

If the intermediate element comprises an adhesive section or consists of such an adhesive section, then it is preferable to provide a cover layer that can be peeled off from the adhesive section. Such a cover layer protects the adhesive section during the transport of the assembly module consisting of the profile strip, the reinforcement strip and the windshield. The cover layer can then be peeled off shortly before the assembly of the adjacent vehicle part.

In addition or as an alternative to the above-mentioned described connection modalities, the connecting section of the reinforcement strip can also have a positive-connection section to establish a positive connection to the adjacent vehicle part or to an intermediate element that can be connected to the adjacent vehicle part. Within the scope of the present invention, a positive connection is understood to mean that the positive connection is active in at least one positive-connection plane. In this context, it is possible, but not absolutely necessary, for the positive connection to comprise positive-connection sections which jointly form an undercut. Such an undercut can be part of a latching engagement between the connecting section of the reinforcement strip and a connecting section of the adjacent vehicle part.

As explained above, the adjacent vehicle part and the reinforcement strip are connected to each other by means of a first connector. A second connector is active between the insertion section of the reinforcement strip and the second connecting area of the profile strip. Preferably, the above-mentioned first and second connectors are configured in such a way that the actuation force for detaching the first connector is higher than the actuation force for detaching the second connector. In this manner, a disassembly force exerted onto the vehicle module initially brings about a detachment of the second connector but not a detachment of the first connector. As a result, a disassembly force ensures that an adjacent vehicle part, together with the reinforcement strip, can be severed from the profile strip. Consequently, an inadvertent severing of the connection between the adjacent vehicle part and the reinforcement strip can be avoided.

In particular, it is preferable that the first connector cannot be detached non-destructively. This takes into account that, after the reinforcement strip has been connected to the adjacent vehicle part, it should form an additional component of the adjacent vehicle part which can be handled together with the adjacent vehicle part. In this manner, the adjacent vehicle part, along with the reinforcement strip connected to it, can be handled by a technician as if it were just "one component".

Embodiments of vehicle modules are designated in their entirety in the drawing by the reference numeral 10. The vehicle modules comprise a profile strip 12 having a first connecting area 14 that serves to establish a connection to an edge area 16 of a windshield 18.

The vehicle module 10 also comprises a vehicle part 20 that is adjacent to the windshield 18. The vehicle part 20 is especially the cover of a water trough of a motor vehicle.

The profile strip 12 has a second connecting area 22 that serves to establish a connection to a reinforcement strip 24.

The reinforcement strip 24 has an insertion section 26 that is inserted into the second connecting area of the profile strip 12 and that remains permanently in the second connecting area 22, and it also has a connecting section 28 to establish the connection to the adjacent vehicle part 20.

The connecting section 28 of the embodiment according to FIG. 1 is an integral bonding section 30 that is integrally connected, especially welded, to the integral bonding section 32 of the adjacent vehicle part 20.

The connecting section 28 is recessed relative to an outer sealing surface 34 of a sealing section 36 of the profile strip 12, whereby the dimension of the offset corresponds to the thickness 38 of an edge area of the vehicle part 20. In this manner, an outer surface 40 of the adjacent vehicle part 20 is arranged at the same height as the outer sealing surface 34. These surfaces, together with an outer surface 42 of the windshield 18, form a flush, flat arrangement.

The profile strip 12 is glued in a generally known manner by an adhesive means 44 to the edge area 16 of the windshield 18. The edge area 16 is especially the lower edge area of the windshield 18 in its installed position on a motor vehicle.

A connection between the reinforcement strip 24 and the adjacent vehicle part 20 is designated in its entirety as the "first connector 46"—and this applies to all of the embodiments. A connection between the reinforcement strip 24 and the profile strip 12 is designated in its entirety as the "second connector 48"—and this applies to all of the embodiments.

It is preferable for the second connector 48 to comprise a latching connection 50 that is active between the insertion section 26 and the second connecting area 22.

The latching connection 50 preferably has a barb-shaped latching element 52 that is configured on the profile strip 12, and that is arranged at an undercut area 54 of the profile strip 12 and that interacts with a latching element receptacle 56 of the insertion section 26 so as to latch.

In order to join the reinforcement strip 24 to the second connecting area 22, the insertion section 26 is inserted into an approximately U-shaped receiving space 58 of the second connecting area 22 until the latching element receptacle 56 latches with the latching element 52. In this state, the insertion section 26 is accommodated in the receiving space 58.

The connecting section 28 is arranged outside of the receiving space 58 and configured to be permanently connected to the adjacent vehicle part 20.

Other embodiments of vehicle modules 10 will be described below making reference to FIGS. 2 to 8. The individual special features of the vehicle modules according to FIGS. 2 to 8 lie in the construction of the first connector 46 that is active between the reinforcement strip 24 and the adjacent vehicle part 20. For the rest, as far as the embodiment according to FIGS. 2 to 8 is concerned, reference is hereby made to the description given above for the embodiment according to FIG. 1.

Figure 2:
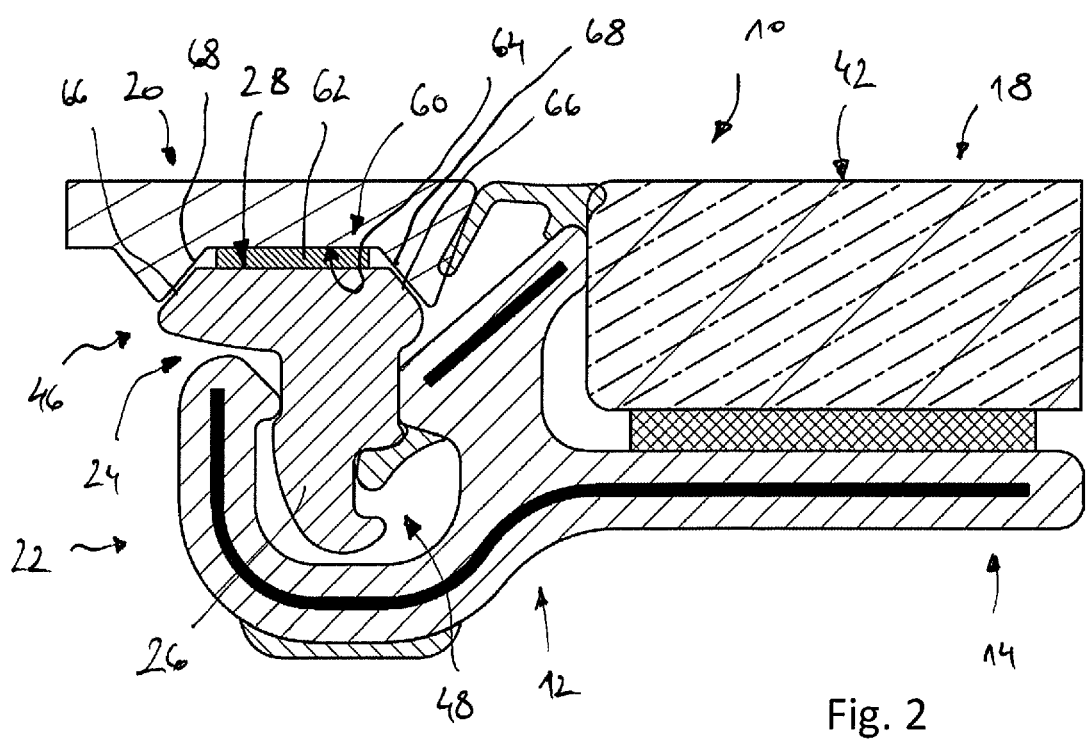
FIG. 2 a side view of another embodiment of a vehicle module.

The first connector 46 of the vehicle module 10 according to FIG. 2 comprises an intermediate element 60 in the form of an adhesive section 62, especially in the form of double-sided adhesive tape. The adhesive section 62 is glued to the connecting section 28 of the reinforcement strip 24 on a first adhesive side. Moreover, the adhesive section 62 is glued to the connecting section 64 of the vehicle part 20 on an adhesive side opposite from the first adhesive side.

In order to simplify the assembly of the vehicle part 20 onto the reinforcement strip 24 and in order to simplify the connection of these components, the reinforcement strip 24 has positive-connection sections 66 that are configured, for example, as positive-connection surfaces that are slanted relative to each other. The positive-connection surfaces 66 interact with positive-connection surfaces 68 of the vehicle part 20 that are complementary thereto. Within the scope of the assembly of the vehicle part 20 onto the reinforcement strip 24, the positive-connection surfaces 66 and 68 assist with the relative positioning of the vehicle part 20 and of the reinforcement strip 24. The positive connection between the positive-connection surfaces 66 and 68 is active in a positive-connection plane that extends parallel to the outer surface 42 of the windshield 18 (see FIG. 2).

Figure 3:
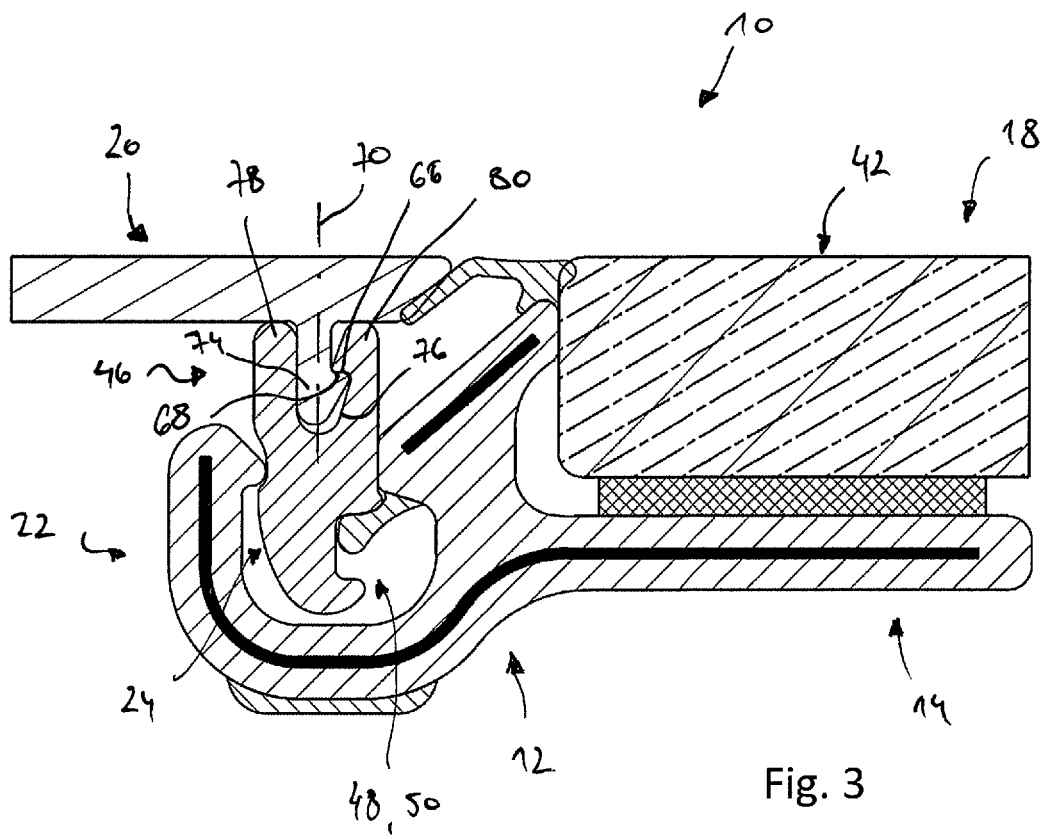
FIG. 3 a side view of another embodiment of a vehicle module.
Figure 4:
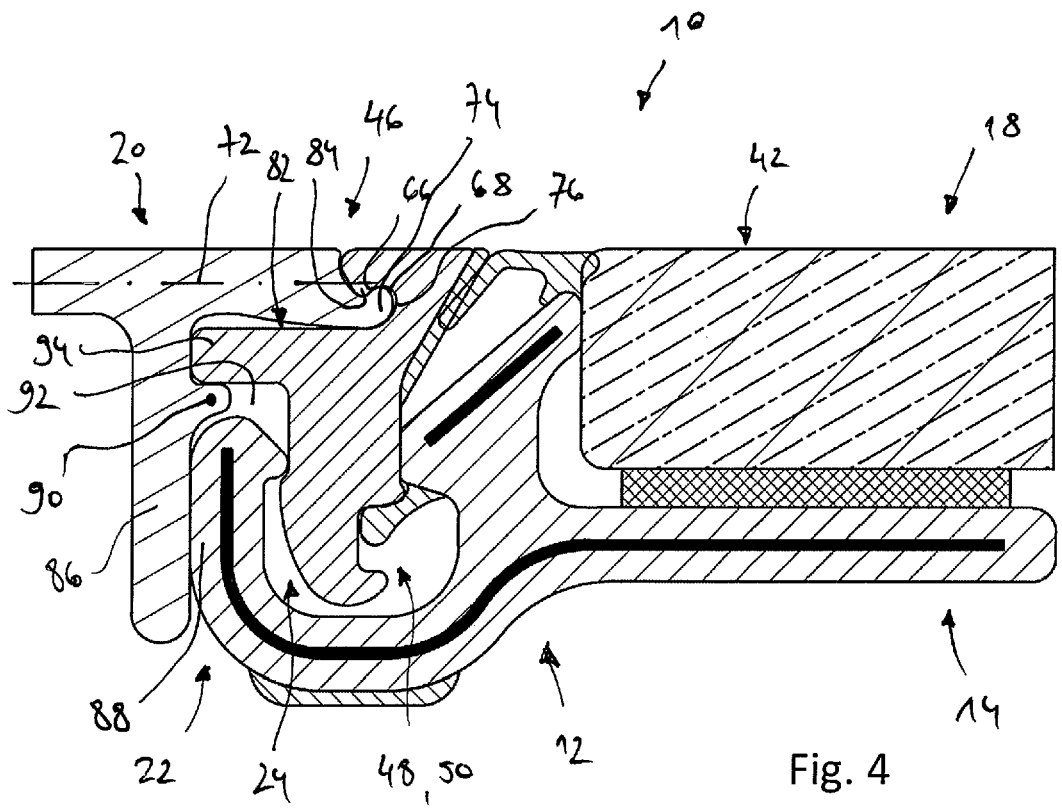
FIG. 4 a side view of another embodiment of a vehicle module.
Figure 5:
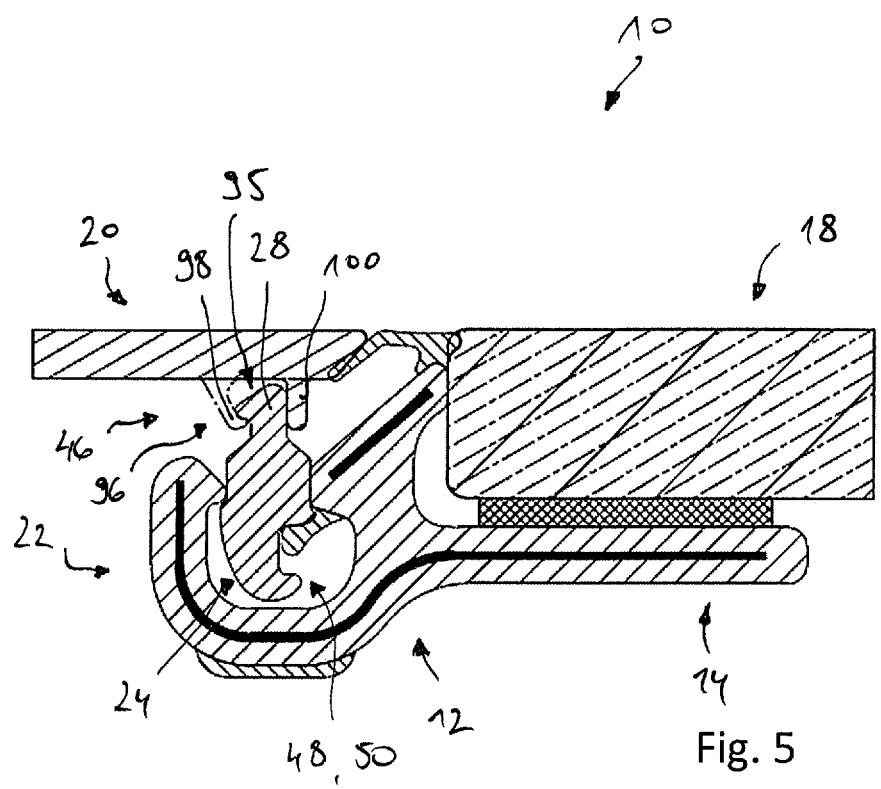
FIG. 5 a side view of another embodiment of a vehicle module.
Figure 6:
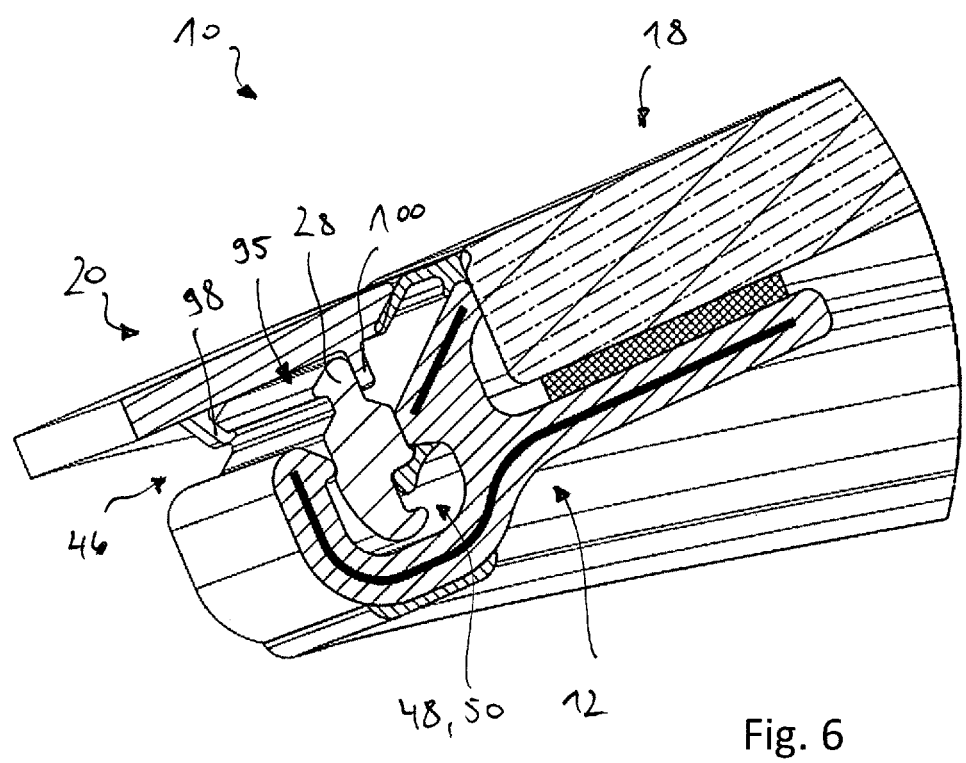
FIG. 6 a perspective view of the vehicle module according to FIG. 5.
Figure 7:
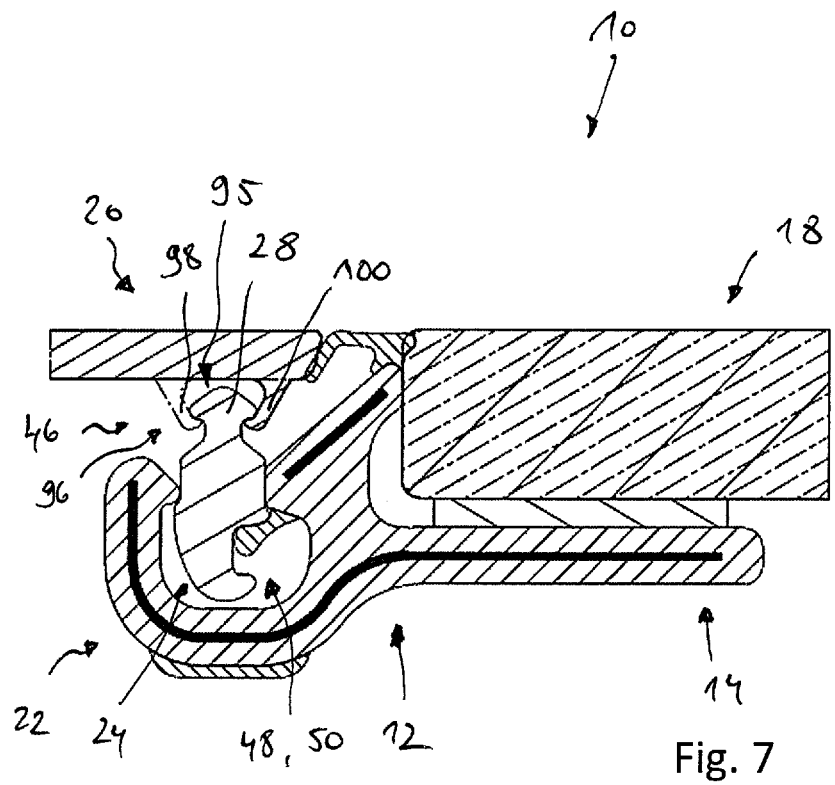
FIG. 7 a side view of another embodiment of a vehicle module.
Figure 8:
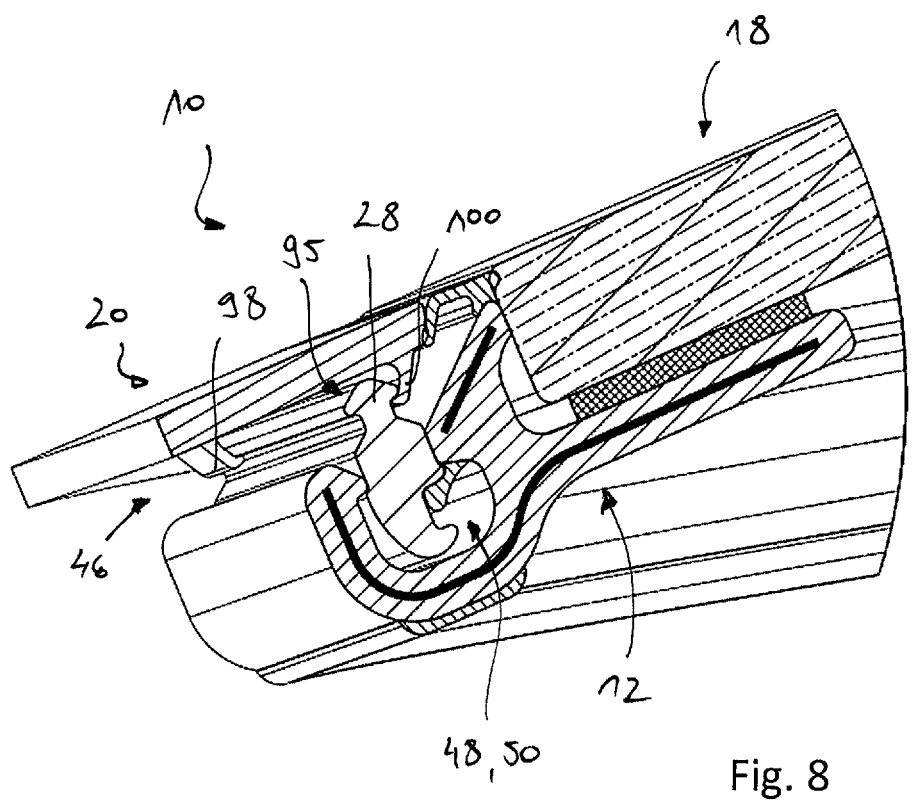
FIG. 8 a perspective view of the vehicle module according to FIG. 7.

The positive-connection sections 66 and 68 can also jointly form an undercut, see FIGS. 3 and 4. The positive-connection sections 66 and 68 can especially be latched together. Here, a latching plane 70—in which the positive-connection sections 66 and 68 that are to be latched together are joined to each other—can be oriented at an angle, especially perpendicular, to the outer surface 42 of the windshield 18 (see FIG. 3) or else largely parallel thereto (see FIG. 4).

In the case of the latching connection according to FIG. 3, the vehicle part 20 comprises a latching hook or a latching strip 74 that is held in a latching element receptacle 76 of the reinforcement strip 24 so as to latch. Here, the latching element receptacle 76 is delimited by two legs 78 and 80 of the reinforcement strip 24 that are parallel to each other.

In the embodiment according to FIG. 4, the latching element receptacle 76 is formed between a contact surface 82 and an overhang 84 of the reinforcement strip 24.

In order to further improve the fixation of the vehicle part 20 to the reinforcement strip 24 and to the profile strip 12, the vehicle part 20 according to FIG. 4 has a web 86 that, when the vehicle part 20 is in its mounted state, is in contact with a free spring leg 88 of the profile strip 12.

In order for the attachment of the vehicle part 20 to be further optimized, it has a projection 90 that projects into a free space 92 located between the free end of the spring leg 88 and a web 94 of the reinforcement strip 24 and that reaches behind the web 94 frictionally and/or positively (see FIG. 4).

In the case of the first connector 46 of the embodiments according to FIGS. 5 to 8, the appertaining connecting sections 28 of the reinforcement strip 24 have latching elements 95 that are latched to a latching element receptacle 96 of the vehicle part 20 and that are especially configured to be ball-shaped, mushroom-shaped, harpoon-shaped or pine tree-shaped.

Preferably, the latching element receptacle 96 comprises two material sections 98 and 100 that are arranged on sides of the connecting section 28 that are facing away from each other. Here, it is possible that only one of the material sections, for example, material section 98, is configured as a latching hook and that the other material section, for example, material section 100, is configured as a contact section for contact of the connecting section 28, see FIGS. 5 and 6. However, it is also possible for each of these material sections 98 and 100 to be configured as latching hooks, see FIGS. 7 and 8.

Moreover, it is possible for at least one of the material sections 98, 100 to extend along the entire length of the profile strip 12. Furthermore, it is possible for at least one of the material sections 98, 100—relative to the direction of extension of the profile strip 12—to have a limited length, for example, of several millimeters, see FIGS. 6 and 8, see material section 98.

The positive-connection sections 66, 68 and/or the material sections 98, 100 and/or the latching elements 95 or the latching element receptacles 96 described above with reference to FIGS. 2 to 8 can also each be arranged kinematically reversed in terms of their arrangement on the reinforcement strip 24 or on the adjacent vehicle part 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A profile strip arrangement, comprising:
    a profile strip having a first connecting area configured to establish a connection to an edge area of a windshield of a motor vehicle and having a second connecting area configured to establish a connection to a vehicle part that is adjacent to the windshield; and
    a reinforcement strip that is detachably connected to the profile strip, the reinforcement strip having an insertion section that is inserted into the second connecting area such that the insertion section imparts transport protection to the second connecting area prior to assembly of the profile strip arrangement to the adjacent vehicle part, and the reinforcement strip having a connecting section configured to establish the assembly to the adjacent vehicle part such that the insertion section remains in the second connecting area after the assembly.

2. The profile strip arrangement according to claim 1, wherein the reinforcement strip does not have a handling section that would serve to detach the reinforcement strip from the profile strip.

3. The profile strip arrangement according to claim 1, wherein the insertion section is secured in the second connecting area by a latching connection.

4. The profile strip arrangement according to claim 3, wherein the latching connection comprises a barb-shaped latching element that is configured on the profile strip and that interacts with a latching element receptacle of the reinforcement strip.

5. The profile strip arrangement according to claim 1, wherein the connecting section has an integral bonding section configured to establish an integrally bonded connection to the adjacent vehicle part.

6. The profile strip arrangement according to claim 1, wherein the connecting section is connected to an intermediate element that is connectable to the adjacent vehicle part.

7. The profile strip arrangement according to claim 6, wherein the intermediate element comprises or consists of an adhesive section.

8. The profile strip arrangement according to claim 7, wherein the adhesive section is configured to be glued to the adjacent vehicle part.

9. The profile strip arrangement according to claim 7, wherein a cover layer that is peelable off from the adhesive section is provided.

10. The profile strip arrangement according to claim 1, wherein the connecting section of the reinforcement strip has a positive-connection section configured to establish a positive connection to the adjacent vehicle part or to an intermediate element that is connectable to the adjacent vehicle part.

11. An assembly module comprising the profile strip arrangement according to claim 1 and the windshield.

12. A vehicle module comprising the profile strip arrangement according to claim 1 and the adjacent vehicle part.

13. The vehicle module according to claim 12, wherein the connecting section of the reinforcement strip and the adjacent vehicle part are integrally bonded to each other.

14. The vehicle module according to claim 12, wherein the connecting section of the reinforcement strip is recessed relative to an outer sealing surface of the profile strip such that after the assembly of the profile strip arrangement to the adjacent vehicle part an outer surface of the adjacent vehicle part and the outer sealing surface are arranged at the same height.

15. The vehicle module according to claim 12, wherein the connecting section is connected to an intermediate element that is connected to the adjacent vehicle part.

16. The vehicle module according to claim 15, wherein the intermediate element comprises or consists of an adhesive section.

17. The vehicle module according to claim 12, wherein the connecting section of the reinforcement strip is positively connected to the adjacent vehicle part or to an intermediate element that is connected to the adjacent vehicle part.

18. The vehicle module according to claim 12, wherein the adjacent vehicle part and the reinforcement strip are connected to each other by a first connector, and wherein the first connector and a second connector that is active between the insertion section of the reinforcement strip and the second connecting area of the profile strip are configured in such a way that an actuation force to detach the first connector is higher than an actuation force to detach the second connector.

19. The vehicle module according to claim 18, wherein the first connector cannot be detached non-destructively.

20. A method to assemble a vehicle module, the method comprising:
    providing the profile strip arrangement according to claim 1;
    inserting the insertion section of the reinforcement strip into the second connecting area of the profile strip after or before the profile strip is connected to the edge area of the windshield; and then
    connecting the adjacent vehicle part to the reinforcement strip.

21. The method according to claim 20, wherein the adjacent vehicle part is connected to the reinforcement strip after or before the windshield is connected to a windshield receptacle of the motor vehicle.

22. The method according to claim 20, wherein the adjacent vehicle part is a water trough cover.

23. The vehicle module according to claim 12, wherein the adjacent vehicle part is a water trough cover.

* * * * *